United States Patent
Holt

[11] 3,823,813
[45] July 16, 1974

[54] ROLL FEED AND PACKAGE GROUP FORMING CONVEYOR

[75] Inventor: Ronald Holt, Battle Creek, Mich.
[73] Assignee: Battle Creek Packaging Machines, Inc., Battle Creek, Mich.
[22] Filed: Feb. 9, 1973
[21] Appl. No.: 330,958

[52] U.S. Cl. .................................. 198/76, 198/34
[51] Int. Cl. ........................................ B65g 37/00
[58] Field of Search .................... 198/76, 34, 102

[56] References Cited
UNITED STATES PATENTS

| | | | |
|---|---|---|---|
| 3,178,007 | 4/1965 | Standley et al. | 198/34 |
| 3,190,434 | 6/1965 | Dardaine | 198/76 X |
| 3,608,695 | 9/1971 | Hellstrom | 198/34 X |
| 3,656,606 | 4/1972 | Comstock et al. | 198/34 |

Primary Examiner—Evon C. Blunk
Assistant Examiner—Douglas D. Watts
Attorney, Agent, or Firm—Austin A. Webb

[57] ABSTRACT

A parallel pair of supply belts deliver lines of articles (rolls) to retractable gates. Higher speed belts with top pressure rolls spaced above them separate pairs of articles from following articles on the supply belts and create gaps in the lines. Parallel vertical chain loops at each side of the lines have pusher bars extending therebetween and advance the bars downwardly between the pressure rolls and into the gaps in the lines of articles, then push the package group on to and transversely across the way of a receiving conveyor where incoming flights bars pick up the package group and feed it at right angles to a wrapping machine. The number of pusher bars on the chain loops and their speed can be varied to advance single or plural pairs of articles to the receiving way, and the distance of advance of the pusher bars can be adjusted to center package groups of different sizes in front of the flight bars on the receiving conveyor. The gates are synchronized with successive flight bars on the receiving conveyor, and the speeds of the accelerating belts, pressure rolls, and chain loops are adjustable to advance package groups of different lengths to the center of the receiving conveyor. A package guiding gate swings up behind package groups having plural pairs of articles as the group is delivered to the receiving conveyor.

5 Claims, 7 Drawing Figures

ROLL FEED AND PACKAGE GROUP FORMING CONVEYOR

RELATED APPLICATIONS

The article group forming apparatus of this invention is an improvement on the apparatus disclosed in copending application, Ser. No. 311,304 Filed Dec. 1, 1972, for Article Group Assembly & Forwarding Conveyor For Wrapping Machines.

OUTLINE OF INVENTION

The above identified application discloses structure for separating two roll or four roll package groups of toilet paper from two supply conveyors by delivering the desired number of rolls past timing gates and accelerating the group between high speed belts that deliver directly to the receiving conveyor. Adjustment between two and four roll groups is accomplished by intermittent and two speed operation of the the accelerating belts.

The present invention provides short accelerating belts positioned below overhead pressure rolls which operate continuously to accelerate pairs of rolls of paper from the gates and the supply conveyors. This creates gaps between the incoming rolls, and transverse pusher bars carried by chain loops on each side of the accelerating belts are advanced downwardly between two of the pressure rolls to behind each package group. The bars then advance the package group onto the receiving conveyor in timed or synchronized relation to the continuously advancing flight bars of the receiving conveyor.

The distance of advance by the transverse pusher bars is adjusted with the length of the package by longitudinally shifting the positions of idler sprockets at diametrically opposite corners of the chain loops which carry the pusher bars. When a single pair or two roll package is to be formed, the chain loops carry four equally spaced pusher bars and advance the group to the center of the receiving conveyor. When two pair or four roll packages are to be formed, alternate pusher bars are removed from the chain loops, an the rear idler pulleys are retracted away from the receiving conveyor so that two more widely spaced pusher bars advance the longer four roll package groups a shorter distance to the center of the receiving conveyor.

When the less stable four roll groups are being delivered, a flat side rail swings up from the supporting slideway behind each package group to hold and guide the four roll group as the direction of movement is changed by the flight bars of the receiving conveyor.

The speeds of the several belts are adjusted for two roll or four roll operation by shifting a single drive belt between high speed and slow speed pulleys. The frequency and duration of closing of the entrance gates at the off-feed end of the supply conveyors is regulated by an adjustable timing switch that makes one cycle with each advancing set of flight bars on the receiving conveyor.

DESCRIPTION

The drawings, of which there are five sheets, illustrate a highly practical form of the invention.

Figure 1:
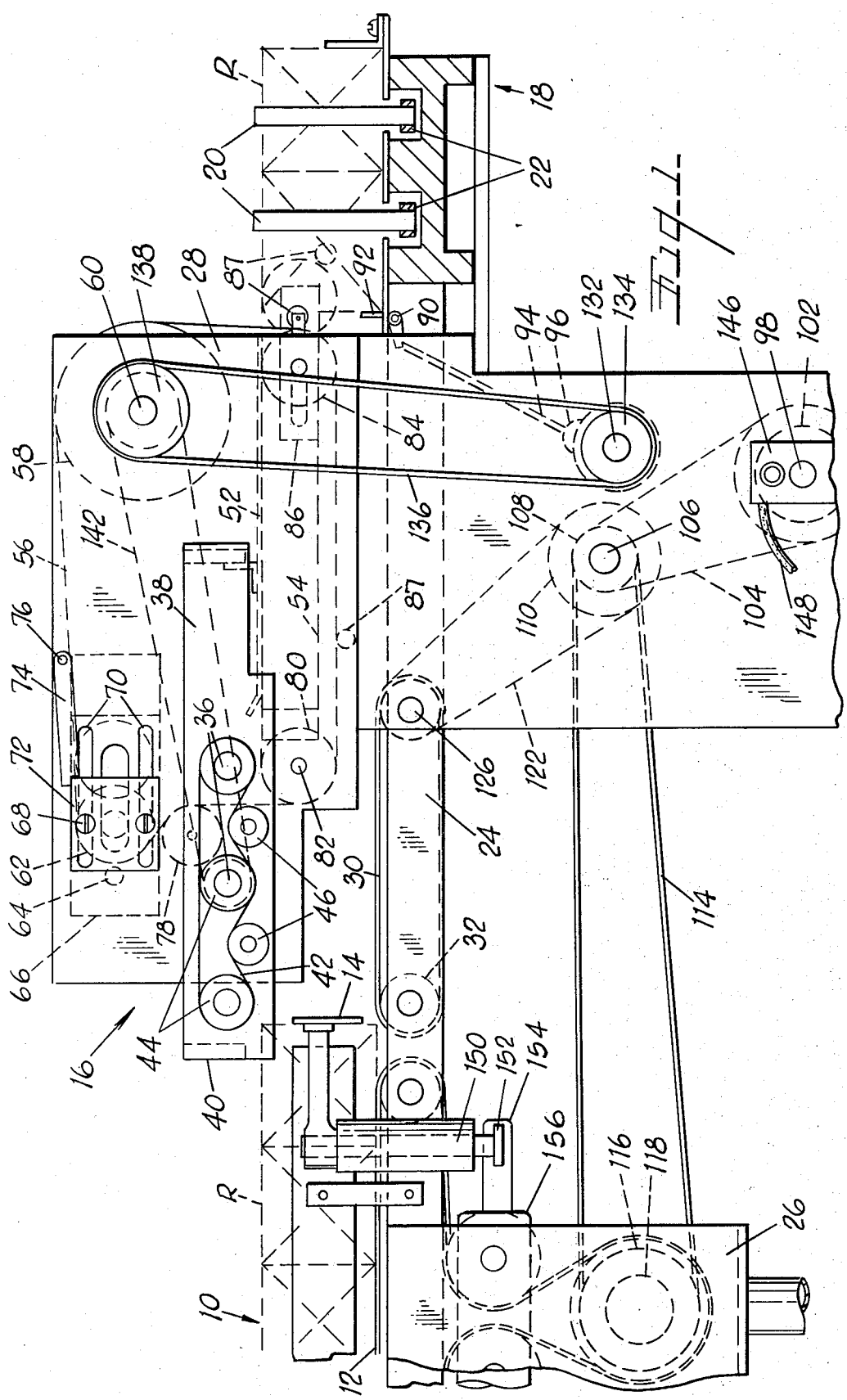
FIG. 1 is a side elevational view of the apparatus.

Generally, the apparatus consists of a pair of side by side supply conveyors 10 having belts 12 for delivering rolls R of toilet paper from a source and in end to end relation. Gates 14 are swingably mounted at the ends of the belts and are actuated as will be described in greater detail to release rolls to a package group forming an accelerating connveyor generally indicated at 16. The accelerating conveyor delivers rolls transversely over the end of a receiving conveyor 18 having pairs of flight bars 20 advanced by chains 22 for further advancing the package groups to a wrapping machine (not illustrated). The principal structural elements are spaced side rails 24 that are suitably cross connected and supported as by columns, one of which is shown at 26 in FIG. 1. The accelerating conveyor parts are carried by vertical side plates 28 connected to the side bars annd projecting thereabove and therebelow.

Figure 2:
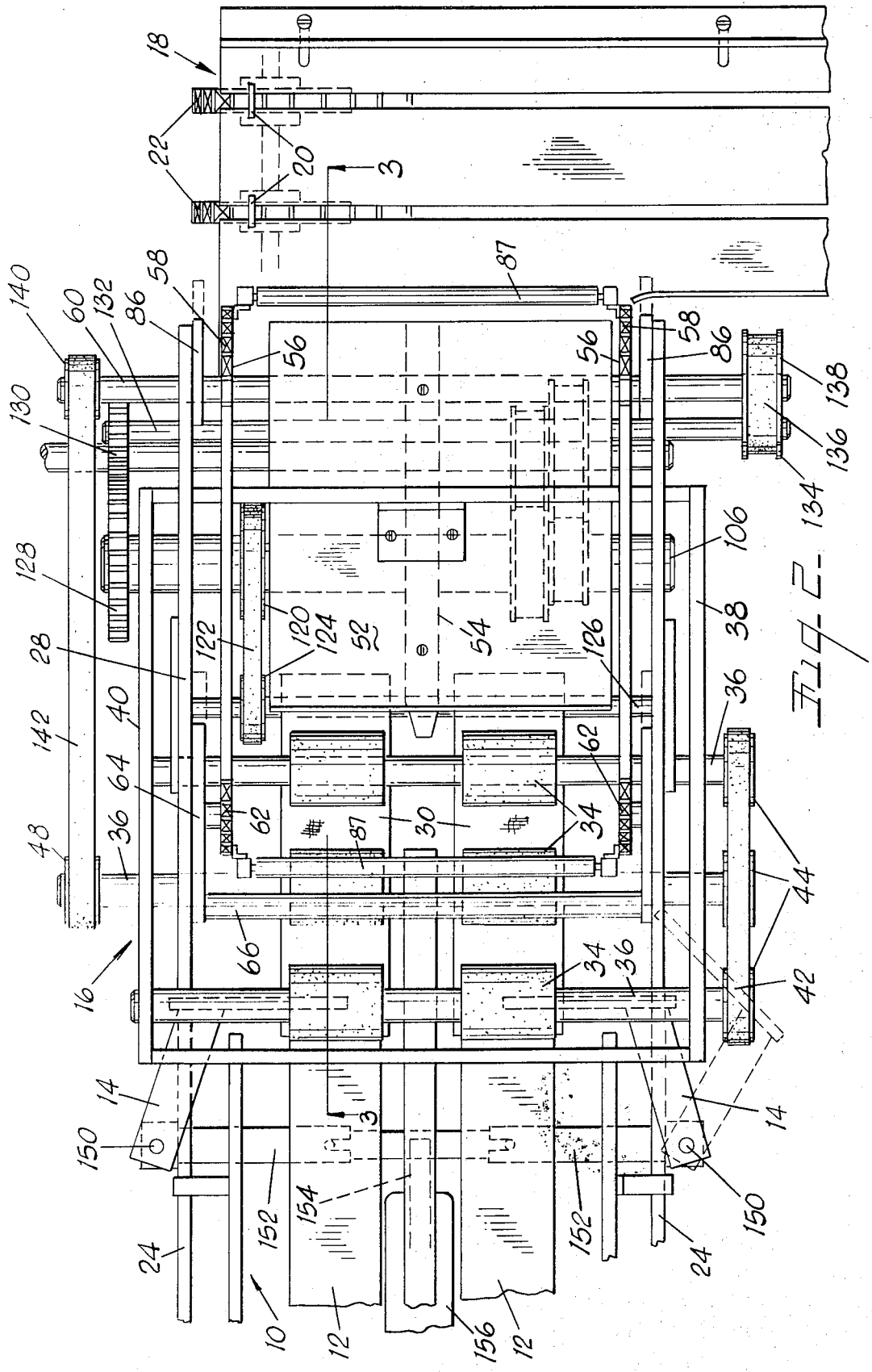
FIG. 2 is a top plan view of the apparatus.
Figure 3:
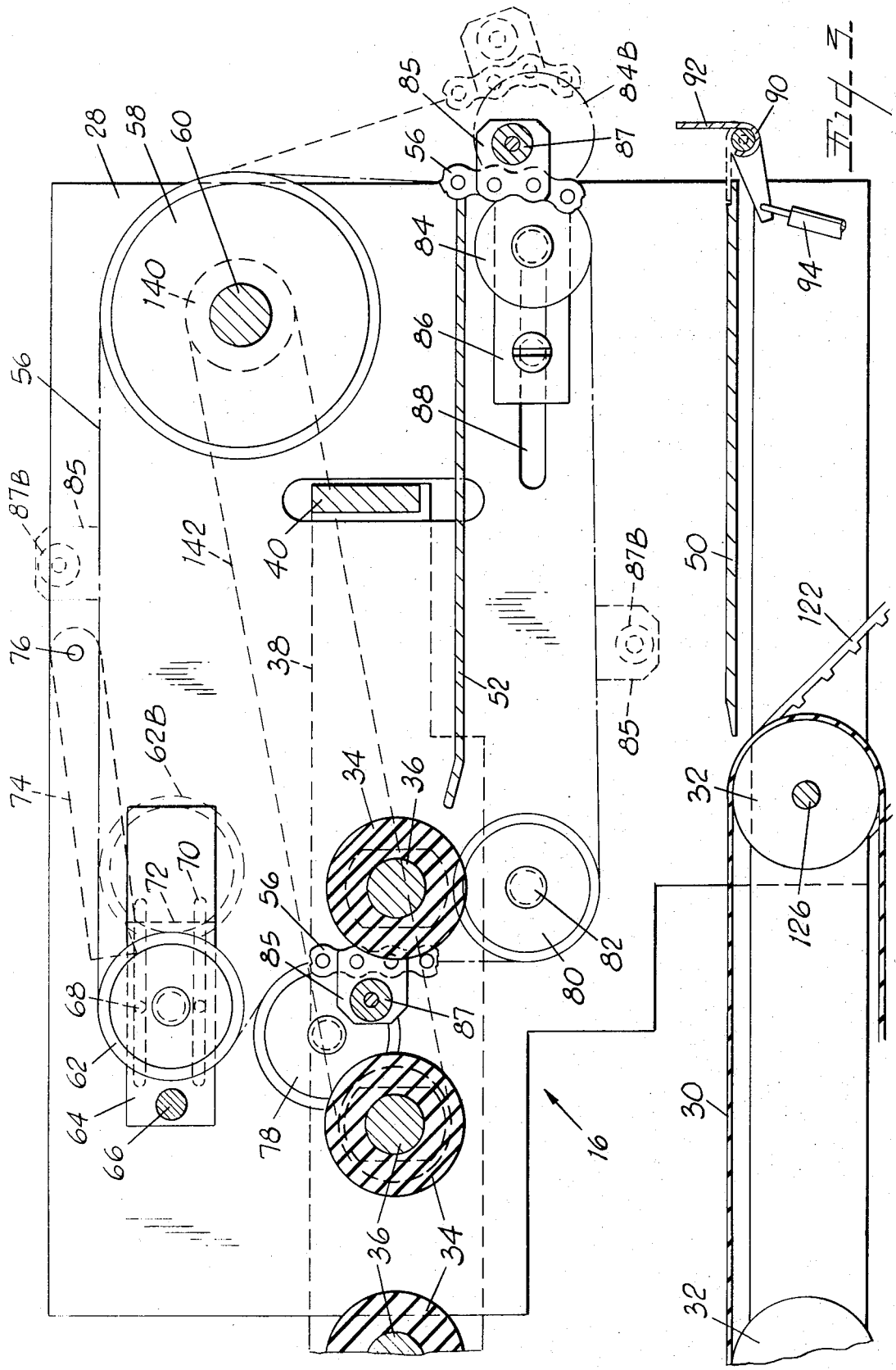
FIG. 3 is a fragmentary enlarged vertical cross sectional view taken along the plane of the line 3—3 in FIGS. 2 and 4.
Figure 4:
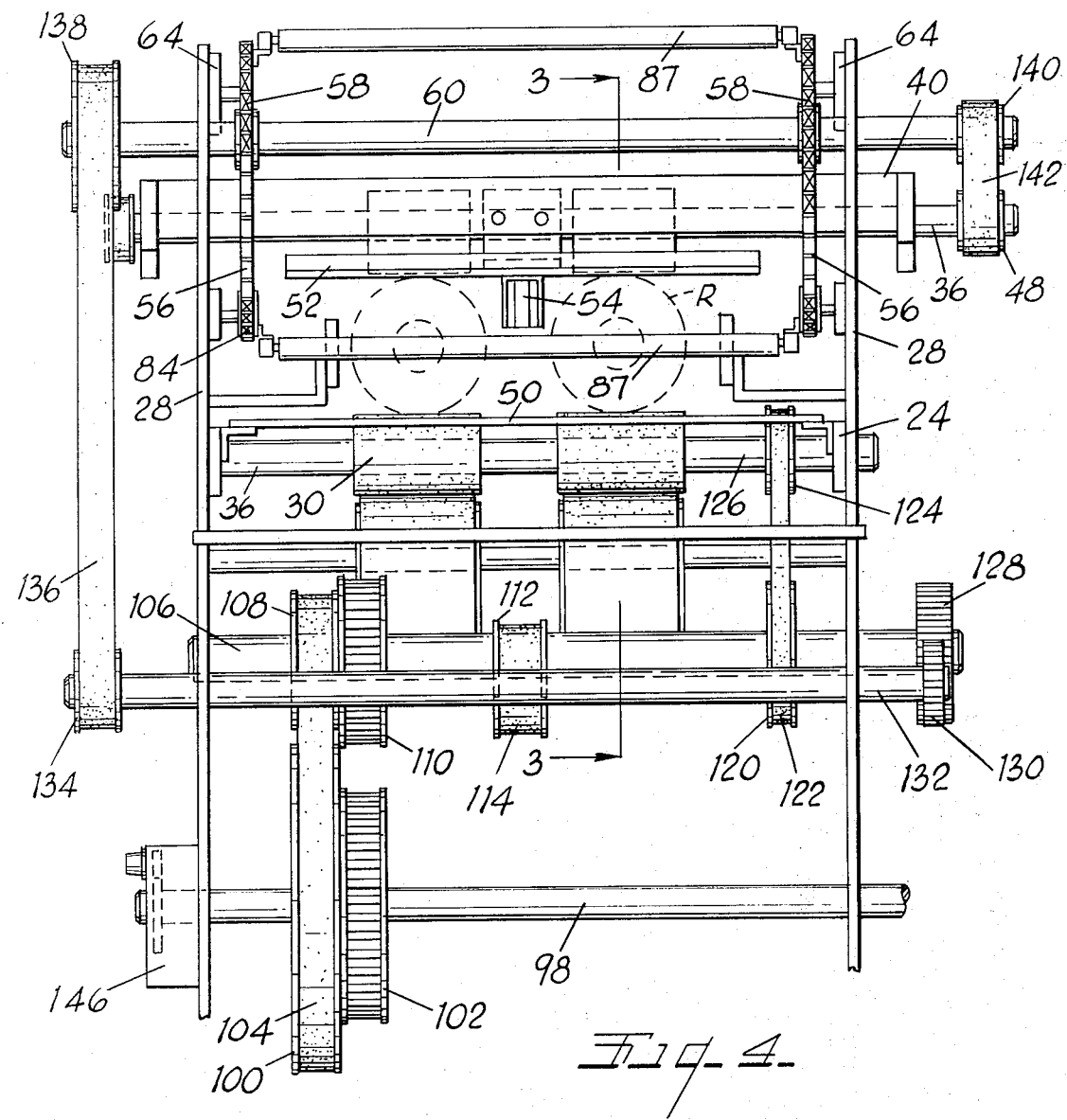
FIG. 4 is a rear elevational view of the apparatus.

Within the accelerating conveyor 16, a pair of accelerating belts 30 carried by rollers 32 receive the rolls released by the gates 14. Mounted in vertically adjustable superimposed relation above the belts 30 are three pressure rollers 34 which extend across both belts 30 and which are driven at the same speed to assure positive feeding of the rolls of paper. The rollers 34 are carried by cross shafts 36 which are journaled at their ends in the side bars 38 of a rectangular frame 40. The frame 40 is vertically adjustable by structure which is not illustrated so that the rollers 34 will apply the proper top pressure to rolls of paper being advanced thereby. The three cross shafts 36 are connected on the front side of the apparatus as illustrated by a belt loop 42 running over pulleys 44 and tightener pulleys 46. The center shaft 36 projects from the rear side of the frame 40 and carries a driving pulley 48, the drive to which will be described presently. After the paper rolls R are passed from between the pressure rollers 34 and the accelerating belts 30 they are fed between a lower plate 50 and a top plate 52 forming a slideway. A rail 54 depending from the top plate (see FIGS. 1, 2 and 4) forms a divider between the two rows oof rolls.

In order to advance the rolls of paper between the plates 50 and 52 the upwardly extending portions of the vertical plates 28 each carry a vertically disposed chain loop indicated at 56. The chain loops are trained over drive sprockets 58 on an elevated cross shaft 60 and extend forwardly over longitudinally adjustable idler sprockets 62. The sprockets 62 are carried by bars or plates 64 connected by a cross rod 66. Bolts 68 extend from the plates through slots 70 in the side plates 28 to clamp plates 72 so that the positions of the sprockets may be adjusted from the forward full line positions illustrated to rearwardly displaced positions indicated by dotted lines at 62B. Latch bars 74 pivoted to the side plates at 76 lock the slide plates and sprockets in forwardly adjusted position. In the forwardly adjusted positions of the sprockets 62, the chain loops 56 are then directed rearwardly and downwardly over fixed idler sprockets 78. When the sprockets 62 are adjusted rearwardly, the chain loops run directly downwardly to idler sprockets 80 fixedly mounted on the side plates at 82. From the idler sprockets 80, the loops 56 extend horizontally rearwardly to adjustable sprockets 84. Guide rails for the chain loops may be provided for the lower reaches thereof if desired, but are not illustrated for the purpose of clairity.

Figure 6:
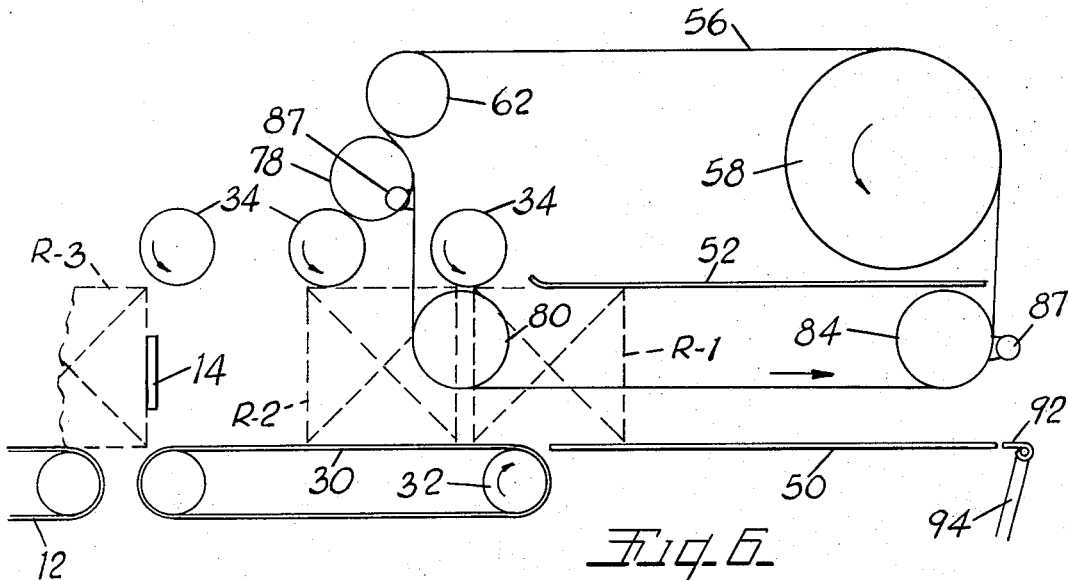
FIG. 6 is a conventional view showing the major elements of the apparatus adjusted for forming and advancing four roll packages.

Idler sprockets 84 are pivoted on slide plates 86 which are adjustable on the side plates as by clamp nuts sliding in slots 88. The forwardly displaced position shown in full lines corresponds to the forwardly adjusted position of idler sprockets 62. When adjusted rearwardly to the dotted line positions 84B and as shown in FIG. 6, the chain loops retain the same length but the lower reaches project closer to the center of the receiving conveyor 18, for advancing two roll package groups to that conveyor. The chain loops then return upwardly to the drive sprockets 58.

Figure 7:
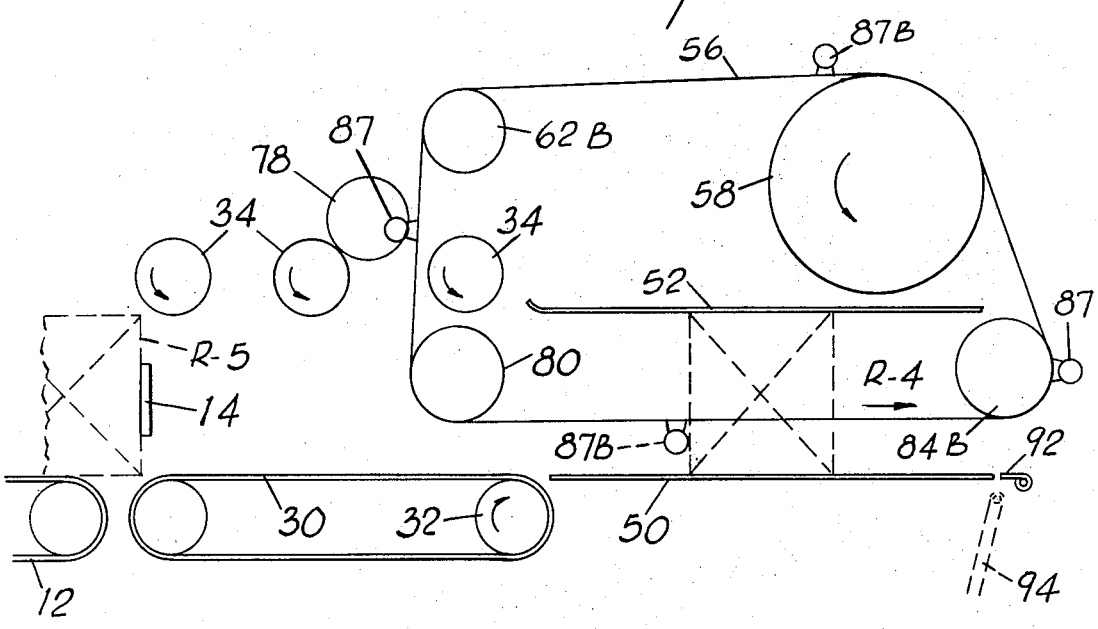
FIG. 7 is a conventional view showing the major elements of the machine adjusted for forming two roll packages.

When arranged for delivering two pairs or four roll package groups, as shown in full lines andd in FIG. 7, each chain loop carries two equally spaced or diametrically opposed carrier clips 85 which support and advance transversely extending pusher bars or rollers 87 around the exteriors of the chain loops. In either adjusted position of the idler sprockets 62, the pusher bars are are advanced downwardly between the two rearmost top pressure rollers 34, where the pusher bars enter between the gaps between package groups and carry them on between the plates 50 and 52. When ssingle pair or two roll package groups are to be advanced, two additional pusher rolls or bars 87B are added to the chain loops in equally spaced positions between the original two bars. The chain loops then feed twice as many of the shorter package rolls pe revolution of the chain loops.

When two pair or four rolls packages are being delivered rapidly to the receiving conveyor, there is a tendency for the end to end rolls of paper to buckle or collapse as they are picked up and moved at right angles by the flight bars 20. Accordingly, the trailing edge of the lower plate 50 is hinged as at 90 and arranged to be swung upwardly as a side guide rail 92 behind each four roll package group. The guide rail is actuated by a push rod froma cam as will be described to raise the rail just as the pusher bar 87 reaches its extreme rearward position. The gate is disconnected and is not used when feeding two roll package groups. The gate is raised by a push rod 94 actuated by a cam 96 on one of the drive shafts as will be described.

DRIVE CONNECTIONS

A main drive shaft 98 carried by the lower portions of the side plates 28 is connected by means not illustrated to make one revolution with the advance of each pair of flight bars 20 of the receiving conveyor. Between the side plates the shaft carries a large high speed pulley 100 and a smaller slow speed pulley 102. A toothed belt or chain 104 is selectively engaged with one or the other of the pulleys and extends upwardly to a first cross shaft 106. When arranged for four roll package operation, the belt drives from the high speed pulley 100 to pulley 108 on shaft 106. For two roll packages the belt is shifted to pulleys 110 and 102. The ratios of the pulleys are selected so that cross shaft 106 makes 1⅓ revolutions per cycle for the four roll packages and two-thirds revolution for the two roll packages. Shaft 106 drives the remaining elements of the accelerating conveyor as follows:

Near the center of shaft 106, a pulley 112 drives a belt 114 that extends rearwardly or to the left to pulley 116 on the pedestal 26 and drives shaft 118 and the supply belts 12. When shaft 106 is driven at its higher speed, belt 114 drives the supply belts at about ten inches per cycle to supply four rolls per cycle.

When the shaft 106 is operating at its slower speed, the infeed belts are driven at about five inches per cycle to supply two rolls per cycle.

Towards its rear side or to the right, shaft 106 carriers a pulley 120 which drives a belt 122 extending upwardly to pulley 124 on shaft 126 to drive the accelerating belts 30. During high speed operation for four roll packages, the belts 30 operate at about 22 inches per cycle. During slow speed and two roll package operation, the belts run at about 11 inches per cycle.

The extreme rear or right end of shaft 106 carries a gear 128 meshing with a gear 130 on a second cross shaft 132. The shaft 132 has a pulley 134 on its forward end which drives the belt 136. Belt 136 extends up to pulley 138 on a top cross shaft 60. Shaft 60 carries and drives the previously menntioned sprockets 58 and the chain loops 56. At high speed operation, the chain loops are driven at about 22 inches per cycle. At slow speed they operate at about 11 inches per cycle; but since the chains then carry four pusher bars or rollers 87, a bar is still carried rearwardly to the receiving conveyor once each cycle.

The top pressure rollers are driven from the top cross shaft by a pulley 140 and belt 142 that extends rearwardly on to the left to a pulley 48 on the middle shaft 36 on frame 40. The other shafts 36 are connected to the middle shaft by the belt loop 42 on the front of the machine. Idler pulleys 46 keep the loop in driving engagement with all three of the pulleys 44.

Figure 5:
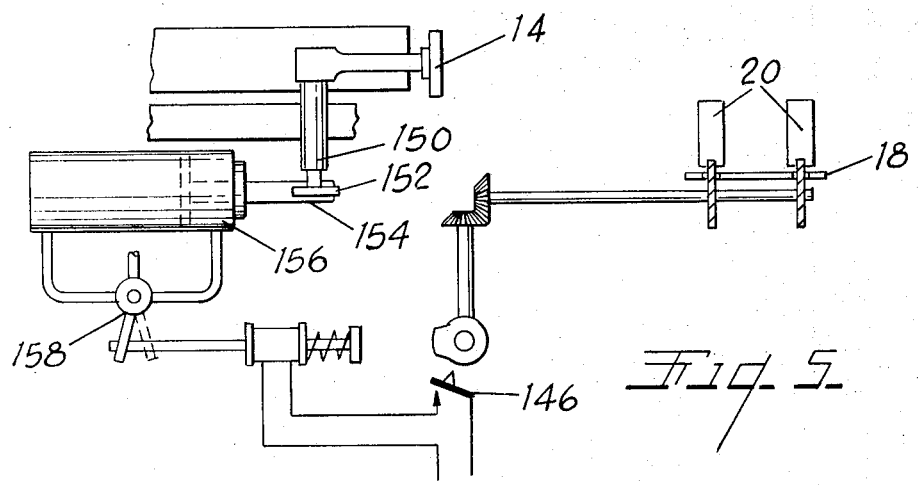
FIG. 5 is a schematic diagram of the gate control and speed regulating system.

An adjustable timing switch 146 mouunted on the front plate 28 is connected to the main drive shaft 98. The switch is adjustable to make and break an electrical circuit through the conductor 148 at selected points and for selected duration in the cycle of rotation of the shaft. The switch is a commercially available item and so is not disclosed in greater detail. As appears most clearly in FIG. 5, the switch controls the operation of the gates 14 a the ends of the supply belts. The gates are carried by pivots 150, and levers 152 extend from the pivots to the piston rod 154 of a pressure cylinder 156 mounted under the belts. A suitable electrically controlled valve 158 actuated or controlled by the switch 146 acts to control the cylinder to open and close the gates at the corrent time in the cycle of the shaft 98 and the same cycle of advance of the flight bars 20. As has been described, the operation of the other parts of the conveyor are tied or timed to the same cycle.

FIGS. 6 and 7 conventionally illustrate the machine in its two adjusted positions or conditions of operation. In FIG. 6, sprockets 62 and 84 are adjusted rearwardly or to the left as shown in full lines in FIGS. 1 – 5, and belt 104 is mounted on the high speed drive pulleys 100 and 108. The conveyor is thus arranged to form, accelerate and deliver two pairs or four roll packages. In FIG. 7 the adjustable sprockets 62 and 84 are adjusted forwardly or to the right, and the belt 104 is trained around the slow speed sprockets 102 and 110 to deliver a single pair or two roll package.

During high speed operation for a four roll package as set up in FIG. 6, drive pulley 32 of the accelerating belts 30 makes about 1 ¼ revolutions per cycle, which is equivalent to about twenty inches linear travel of the accelerating belts per cycle. At the same time the supply belts, driven through pulleys 108 and 116 are operating at about ten inches per cycle. Accordingly, belts 30 and pressure rollers 36 pick up the leading pair of paper rolls R-1 aand advance them to between the plates 52 and 50. Next, the secoond pair of rolls R-2 is picked up and accelerated creating a gap between themselves and the third pair of rolls R-3, and closing the gap between R-1 and R-2. Gates 14 close in the gap between R-2 and R-3, while belts 30 continue to advance both pairs of rolls by pushing R-1 through R-2. As the second pair R-2 clear the last pressure roll 36, pusher bar 88 descends between two pressure rolls behind the four roll pack. Chain loops 56 are driven at about 22 inches per cycle, so the pusher bar coming down between the pressure rollers picks up the four roll package and advances it to the wrapper feed conveyor in less than half a cycle, and leaves the package group in position to be picked up by the flight bars 20. The gates 14 are opened by the timer switch 146 near the end of the next cycle, as the other push bar or rod 88 approaches the pressure rollers.

When the machine is adjusted to form two roll package groups as in FIG. 7, the idler pulleys 62 and 84 are moved to the right, an the number of pusher bars on the chain loops 56 is doubled. The speed of the main drive shaft 60 is reduced by about one-half the former revolutions per cycle. This reduces the speed of the supply belts 12 to about 5 inches per cycle an the speed of the accelerator belts 30 to 10 inches per cycle. The speed of the chain loops is also reduced one-half, but the addition of the extra pusher bars or rolls 88 leaves the frequency of advance of the bars the same at one bar and on package group per cycle of the flight bars 20.

With one pair of rolls R-4 part way between the ends of the plates 50 and 52 and being advanced by one pusher bar, the gate 14 opens so that a second pair of rolls R-5 is released to be accelerated by belts 30 and pressure rollers 36 ahead of the next incoming pusher bar 88. The apparatus thus continues to supply a package group to each set of flight bars 20 on the receiving conveyor. The relative acceleration of about five inches per cycle by the accelerator belts creates the same gap between the package groups for the gates to operate in. Since the two roll packages are shorter, they are advanced further to center them between the flight bars 20. The gate or side guide 92 is not needed so the push rod is disconnected.

What is claimed as new is:

1. An article forwarding and package group forming conveyor comprising;
   first belt means arranged to supply side by side columns of articles and presenting flat friction supporting surfaces to the articles,
   second belt means arranged in end to end relation to said first belt means to receive articles therefrom and also preventing flat friction supporting surfaces to the articles,
   said second belt means being long enough to receive at least two articles at one time,
   pressure rollers arranged in transversely extending and longitudinally spaced relation over the major portion of the length of said second belt means and beginning over the receiving end of said second belt means,
   a delivery slideway extending from the delivery end of said second belt means and said pressure rollers and including a top presser plate slidably and compressively engageable with the tops of said articles,
   gate means movably positioned between said first and said second belt means to control the movement of articles between the belt means,
   upright carrier loops located alongside of said delivery slideway and extending alongside of the outlet end of said second belt means and thereabove and along said slideway,
   plural transversely extending pusher bars having their ends connected to said carrier loops in spaced relation around the loops whereby the bars are advanced successively downwardly between adjacent pressure rollers and then forwardly in article advancing motion through said slideway,
   first drive means connected to continuously drive said first belt means at a first lineal speed,
   second drive means connected to continuously drive said second belt means and said pressure rollers at a second lineal speed approximately double said first speed,
   third drive means connected to continuously drive said carrier loops at a linear speed approximately equal to said second speed,
   gate operating means connected to open and close said gate means,
   and switch means driven in timed relation to said carrier loops and connected to actuate said gate operating means to open said gate means as each of said pusher bars approaches the forwardly moving lower reaches of the carrier loops.

2. A conveyor as defined in claim 1 in which said carrier loops are trained around idler pulleys that are adjustable forwardly along the lower reaches of the loops to extend the path of travel of said pusher bars over the outlet end of said slideway.

3. A conveyor as defined in claim 2 in which said carrier loops are further trained over other longitudinally adjustable idler pulleys to keep said loops tight in adjusted positions of said first adjustable pulleys.

4. A conveyor as defined in claim 3 in which there is a variable speed multiplying drive to said first, second and third drive means,
   a fraction of said pusher bars connected in equally spaced relation around said carrier loops being removable from the loops.

5. An article forwarding and package group forming conveyor comprising
   side by side supply belts each arranged to supply a line of articles,
   means coacting with articles on said belts to position the articles in side by side transverse rows at the outlet ends of the supply belts,
   a plurality of accelerating belts arranged in article-receiving and forwarding relation to the discharge ends of said supply belts,
   driven pressure rolls disposed in spaced relation above said accelerating belts and arraanged to hold articles down in driving relation to th accelerating belts, said pressure rolls defining a transversely extending and vertically opening passage over said accelerating belts adjacent the delivery ends of the accelerator belts, a delivery way positioned to slidably receive articles from said accelerator belts and pressure rolls, a plurality of vertical carrier loops positioned alongside of said delivery way and extending rearwardly alongside the forward ends of said accelerator belts, an even number of transverse pusher members having their ends secured in spaced relation to said carrier loops and arranged to be advanced thereby downwardly through the passage between said pressure rolls and then forwardly over the delivery ends of said accelerator belts and along said delivery way, a common drive means separately connected to drive said supply belts at a first lineal speed and drive said accelerator belts, said pressure rolls and said carrier loops at a second and faster lineal speed, said common drive means includes an adjustable speed connection for doubling the speeds of the driven parts, and in which alternate ones of said pusher members are removable from said carrier loops, said carrier loops being supported and guided by longitudinally adjustable sprockets at the front ends of the lower reaches of the loops to vary the extent of article advancing motion of said pusher members, there being equally and oppositely adjustable sprockets at the rear ends of the upper reaches of said loops, and fixed guide rollers positioned to receive said carrier loop from said last sprockets in their rearwardly adjusted positions and guide said pusher members through said passage between said rollers.

* * * * *

UNITED STATES PATENT OFFICE
CERTIFICATE OF CORRECTION

Patent No. 3,823,813      Dated July 16, 1974

Inventor(s) Ronald Holt

It is certified that error appears in the above-identified patent and that said Letters Patent are hereby corrected as shown below:

Column 5, line 64, "preventing" should read -- presenting --.

Signed and sealed this 5th day of November 1974.

(SEAL)
Attest:

McCOY M. GIBSON JR.       C. MARSHALL DANN
Attesting Officer      Commissioner of Patents